United States Patent

Basel

[15] 3,659,125

[45] Apr. 25, 1972

[54] NON-CLOGGING NOZZLE FOR ROTATING EQUIPMENT SUCH AS FOR COOLING DYNAMO-ELECTRIC MACHINES

[72] Inventor: Donald R. Basel, Lima, Ohio

[73] Assignee: Westinghouse Electric Corporation, Pittsburgh, Pa.

[22] Filed: Sept. 10, 1970

[21] Appl. No.: 71,005

[52] U.S. Cl...............................................310/54, 239/225
[51] Int. Cl..........................................................H02k 9/19
[58] Field of Search..............310/54; 239/225, 226; 210/380

[56] References Cited

UNITED STATES PATENTS 2,641,189   6/1953   Haugen..............................239/225 X
2,735,026   2/1956   Moerk....................................310/54

FOREIGN PATENTS OR APPLICATIONS 918,117   9/1954   Germany................................239/225

Primary Examiner—D. X. Sliney
Attorney—A. T. Stratton, F. P. Lyle and Gordon H. Telfer

[57] ABSTRACT

A nozzle for spraying fluid outwardly from a rotating member has inner openings that extend non-perpendicularly to the axis of rotation to avoid clogging of the opening by particles acted upon by centrifugal force. The invention is applied in dynamo-electric machines having oil spray cooling of the rotor field coils by oil sprayed out from the hollow rotor shaft.

3 Claims, 2 Drawing Figures

PATENTED APR 25 1972

3,659,125

WITNESSES
Theodore F. Wrobel
James F. Young

INVENTOR
Donald R. Basel
BY Gordon H. Telfer
ATTORNEY

NON-CLOGGING NOZZLE FOR ROTATING EQUIPMENT SUCH AS FOR COOLING DYNAMO-ELECTRIC MACHINES

BACKGROUND OF THE INVENTION

1. Field of the Invention

This invention relates to spray nozzles on high-speed rotating equipment and particularly to such nozzles as are used in the cooling of dynamo-electric machine components.

2. Description of the Prior Art

In some applications air cooling of a dynamo-electric machine is impractical. For example, in supersonic aircraft difficulties are encountered in obtaining and handling the ram air for cooling. At high speeds inlet air temperatures reach such high levels because of the ram effect that air is not a satisfactory coolant. Consequently, interest has developed in machines that are cooled by alternate means that is not dependent on the environment in which the machine operates.

Conduction oil cooling has been used in dynamo-electric machines in which an oil-flow path is provided through the heat generating elements. In early conduction oil cooled machines, engine oil was circulated in a confined cooling passageway which carried it from the generator to heat exchangers where it was deposited into the aircraft fuel or into air at low aircraft speeds. Cooling was accomplished by conducting the heat from the heat sources through low thermal resistance to the oil. Unfortunately, electrical insulation in the machines raises the thermal resistance and a considerably higher specific heat of oil as compared with air impairs cooling.

As an improvement over oil conduction cooling, there has been developed an oil spray cooling concept in which the machine is designed to operate with its housing flooded with oil spray and mist. For cooling the rotor field windings, nozzles are provided on a hollow rotor shaft. The nozzles extend radially outward from the shaft and carry oil from within the shaft into the space in which the windings are located. Since the oil can pick up particles of debris in its circulation through the machine, there is a risk of clogging of the nozzles, which generally have straight through bores.

The invention is particularly useful for application in integrated drive generators comprising a generator and a constant speed drive in an integrated unit with a common oil flow for cooling and lubrication. The description of the integrated drive system and its general design characteristics, including the oil spray concept, have been previously known and are described elsewhere such as in an article by R. L. Gasparetti, in *The Westinghouse Engineer*, May 1969, entitled "The Westinghouse Oil Cooled Generator For The Integrated Drive Generator System," which should be referred to for further background information.

SUMMARY OF THE INVENTION

The invention provides a non-clogging nozzle for use on rotating apparatus, such as oil spray cooled dynamo-electric machines. The nozzle extends through the wall of a hollow rotatable member from which a fluid is to be sprayed. Passageways proximate the inner end of the nozzle extend in a direction non-perpendicular to the axis of rotation of the rotatable member to avoid clogging of the opening by any particles of debris that are acted upon by centrifugal force upon rotation. The location of the apertures of the nozzle non-perpendicular to the axis of rotation, and preferably parallel to that axis, perpendicular to the center-bore of the nozzle, is such that centrifugal force tends to sweep away particles from those openings. Furthermore, a plurality of such openings can be provided at the inner end of the nozzle which gives a quality of redundancy for further reliability.

DESCRIPTION OF THE PREFERRED EMBODIMENTS

Figure 1:
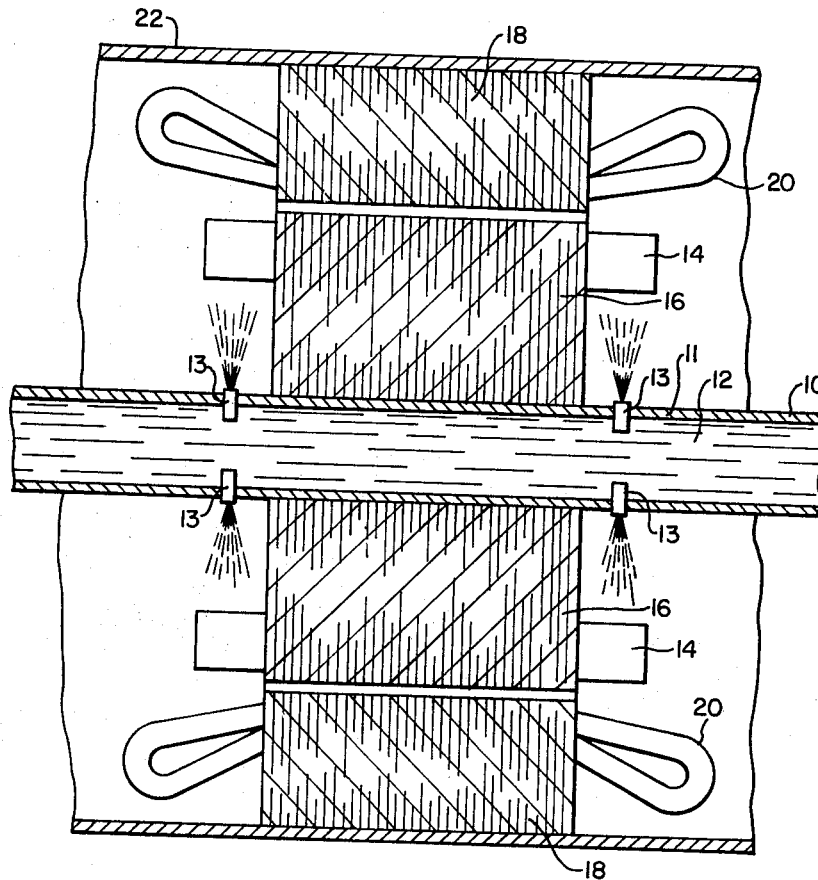
FIG. 1 is a sectional view of a dynamo-electric machine embodying the present invention.

FIG. 1 illustrates in generalized form, a dynamo-electric machine of the oil spray cooled type which may advantageously embody the present invention. The machine is only shown generally for convenience because of the availability of descriptions elsewhere of the details such as in the above-mentioned Gasparetti article. The machine comprises a rotatable member 10 having a wall 11 enclosing a chamber. In this example of the application of the invention, the rotatable member is a hollow shaft 10. The chamber contains a fluid 12 which here is the oil to be sprayed out through nozzles 13 against windings 14 that are disposed on a rotor core 16 that is mounted on the hollow shaft. The rotor 16 is disposed within a stator having core 18 and windings 20. Only partially shown is an enclosure 22 that encloses the elements for operation free from the environment in which the machine is located.

The oil 12 in the shaft 10 is under pressure and is regulated to flow at a certain rate, such as, for example, a pressure of 240 pounds per square inch at the nozzle and a flow rate of four gallons per minute. Rotation of the shaft tends to facilitate the emission of the oil from the shaft. However, at the inner openings of the nozzles, any particle of debris circulating in the oil that is acted on by centrifugal force might tend to clog any opening in the inner face of the nozzle 13. Such centrifugal forces could be quite substantial because of the high speeds of rotation, typically about 12,000 rpm.

Figure 2:
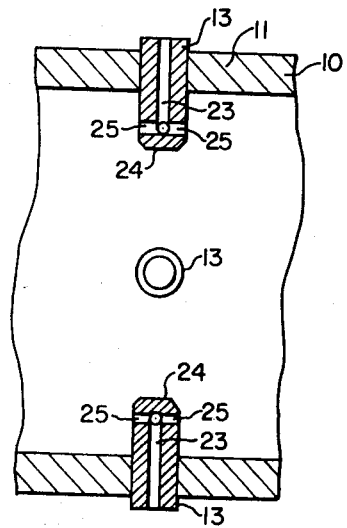
FIG. 2 is an enlarged sectional view illustrating elements of the embodiment of FIG. 1.

FIG. 2 shows the nozzle configuration in greater detail. The hollow shaft 10 has a plurality of nozzles 13 positioned around its periphery and extending through the shaft wall 11. A central bore 23 extends in a radial direction from the axis of rotation and is open at the outer end from which the oil is sprayed. Proximate the inner end of the nozzle is a closed face 24 so that there is no inner opening directly in line with the bore 23 of the nozzle 13. A plurality of openings or passageways 25 are provided perpendicular to the nozzle bore 23.

It can be seen that a particle flung outward by the rotation of the shaft will tend to be swept past the openings 25. Furthermore, the presence of a plurality of such openings 25 insures against blockage of the nozzle from any cause. On the other hand, a nozzle with only a center bore extending from its inner to outer ends would be susceptible to clogging by a particle forced outward by rotation.

I claim:

1. In combination: a rotatable member having a wall enclosing a chamber, said chamber containing a fluid; at least one nozzle on said rotatable member extending through said wall into said chamber with at least one opening proximate each end of said nozzle to permit said fluid to be sprayed outwardly from said rotatable member, said at least one opening proximate the end of said nozzle within said chamber extending in a direction non-perpendicular to the axis of rotation of said rotatable member to avoid clogging of said opening by particles acted upon by centrifugal force upon rotation; said rotatable member comprising a hollow shaft exteriorly supporting heat generating means to be cooled by said fluid; said nozzle being an elongated member having a bore disposed perpendicular to the axis of rotation of said shaft and an outer opening directly at the end of said bore for emission of said fluid in directions perpendicular to said axis; the inner end of said nozzle being closed facing said axis with a plurality of openings to said bore only from surfaces of said nozzle that run perpendicular to said axis.

2. A dynamo-electric machine comprising: a stator; a rotor within said stator and including a centrally located hollow shaft with a center axis of rotation and exteriorly supported field coils; means to cool said field coils comprising at least one nozzle extending on a radial line from said axis through said shaft and having a center bore open to spray a coolant onto said field coils, the inner end of said nozzle having a plurality of openings for receiving said coolant all of which openings extend into said nozzle perpendicular to surfaces parallel to said axis.

3. The subject matter of claim 2 wherein:

a plurality of said nozzles are in spaced locations around the periphery of said shaft.

* * * * *